United States Patent
Rigdon et al.

(10) Patent No.: US 8,019,712 B2
(45) Date of Patent: Sep. 13, 2011

(54) INTELLIGENT THREAT ASSESSMENT MODULE, METHOD AND SYSTEM FOR SPACE SITUATIONAL AWARENESS SYSTEM

(75) Inventors: Debra A. Rigdon, Kent, WA (US); Timothy A. Tibbetts, Renton, WA (US)

(73) Assignee: The Boeing Company, Chicago, IL (US)

( * ) Notice: Subject to any disclaimer, the term of this patent is extended or adjusted under 35 U.S.C. 154(b) by 878 days.

(21) Appl. No.: 12/022,821

(22) Filed: Jan. 30, 2008

(65) Prior Publication Data

US 2009/0192962 A1 Jul. 30, 2009

(51) Int. Cl.
*G06N 5/02* (2006.01)

(52) U.S. Cl. ............................................ 706/47; 706/46

(58) Field of Classification Search .................. 340/425, 340/539.26; 342/13; 706/46, 47
See application file for complete search history.

(56) References Cited

U.S. PATENT DOCUMENTS

| | | | |
|---|---|---|---|
| 5,173,704 A | 12/1992 | Buehler et al. | |
| 6,795,772 B2 | 9/2004 | Lin et al. | |
| 6,980,151 B1 | 12/2005 | Mohan | |
| 7,092,927 B2 * | 8/2006 | Clark et al. | 706/50 |
| 7,109,859 B2 | 9/2006 | Peeters | |
| 7,119,732 B1 | 10/2006 | Lam et al. | |
| 7,212,917 B2 | 5/2007 | Wilson, Jr | |
| 7,355,508 B2 * | 4/2008 | Mian et al. | 340/426.1 |
| 2004/0061595 A1 * | 4/2004 | Yannone et al. | 340/425.5 |
| 2004/0119591 A1 | 6/2004 | Peeters | |
| 2007/0016464 A1 | 1/2007 | Yen et al. | |
| 2007/0198450 A1 * | 8/2007 | Khalsa | 706/47 |

OTHER PUBLICATIONS

Joint Doctrine Space Operations; Joint Publication 3-14; United States Government; Aug. 9, 2002; 87 pages.
Counterspace Operations; Air Force Doctrine Document 2-2.1; United States Air Force; Aug. 2, 2004; 66 pages.
Commander's Handbook for an Effects-Based Approach to Joint Operations; Joint Warfighting Center; Joint Concept Development and Experimentation Directorate; Standing Joint Force Headquarters; United States Government; Feb. 24, 2006; 114 pages.
Supplement 1 to Commander's Handbook for an Effects-Based Approach to Joint Operations; Joint Warfighting Center; Joint Concept Development and Experimentation Directorate; Standing Joint Force Headquarters; United States Government; Mar. 13, 2006; 14 pages.
Supplement 2 to Commander's Handbook for an Effects-Based Approach to Joint Operations; Joint Warfighting Center; Joint Concept Development and Experimentation Directorate; Standing Joint Force Headquarters; United States Government; Mar. 13, 2006; 12 pages.

* cited by examiner

*Primary Examiner* — Jeffrey A Gaffin
*Assistant Examiner* — Ola Olude-Afolabi
(74) *Attorney, Agent, or Firm* — Armstrong Teasdale LLP (57) ABSTRACT

Threat assessment modules are disclosed that intelligently review evidence of potential threats posed by detected objects within a region of exo-atmospheric space and generate a most probable threat scenario to facilitate administration of counterspace operations.

20 Claims, 5 Drawing Sheets

INTELLIGENT THREAT ASSESSMENT MODULE, METHOD AND SYSTEM FOR SPACE SITUATIONAL AWARENESS SYSTEM

BACKGROUND OF THE DISCLOSURE

This disclosure relates generally to artificially intelligent systems that evaluate hypotheses in a virtual world to explain complex scenarios in the real world, and more specifically to artificially intelligent systems for real time comprehensive evaluation of potential threat capabilities and hostile intent presented by detected objects in a space being monitored.

Space superiority is a fundamental part of a military air and space doctrine. Space superiority is gained and maintained through the application of counterspace operations. These counterspace operations are critical to success in modern warfare. Combatant commanders leverage space capabilities to maintain a combat advantage over adversaries. Space superiority ensures a freedom to operate in the space medium while denying the same to adversaries. Key to acquiring and maintaining space superiority is quick and accurate assessments of whether detected objects in a monitored space present a threat of harm to other items in the monitored space. As such, appropriate action can be taken only in response to threatening objects to maintain space superiority. Achieving the goal of accurate and efficient decision making to evaluate potential threat scenarios, however, is enormously challenging, and autonomous analysis tools are desirable to facilitate the process.

BRIEF DESCRIPTION OF INVENTIVE MODULES, METHODS AND SYSTEMS

Consistent with illustrative embodiments disclosed, in one embodiment a computer-implemented threat assessment module for a computer-based space situational awareness system is provided. The space situational awareness system includes a database populated with space object information and subject matter expert information for space objects. The space-situational awareness system receives input data from a sensor fusion system corresponding to a detected object in an exo-atmospheric space, and the threat assessment module is adapted to process the input data for the detected object from the sensor fusion system to reason, using the input data, an identity of the detected object as a known or unknown object. The threat assessment module is further adapted to review, using the reasoned identity of the object, evidence information internal and external to the database that relates to the reasoned identity of the object, with the evidence information supporting a plurality of threat scenario hypotheses corresponding to the reasoned identity. The threat assessment module is further adapted to reason, using the reviewed evidence information, a most probable threat scenario from the plurality of threat scenario hypotheses that is supported by the evidence information.

Optionally, the module may be further adapted to supply the most probable threat scenario to a person. The module may also be adapted to supply the most probable threat scenario to a computer-implemented course-of-action module to evaluate potential responses to the most probable threat scenario. The module may factor in diplomatic, intelligence, military and economic (DIME) information corresponding to the reasoned identity when reasoning the most probable threat scenario. The module may review evidence establishing a capability for executing a threatening action; review evidence establishing a hostile motive for undertaking a threatening action; review evidence establishing an opportunity to undertake a threatening action; review evidence indicative of suspicious behavior; and aggregate the evidence of capability, motive and suspicious behavior to generate the most probable threat scenario. The module may consider kinematic and space catalog information to deduce an identity of the detected object. In one exemplary application, the module may be adapted to identify and evaluate a potential threat posed by a satellite object.

In another embodiment, a method for evaluating an existence of a threat posed by a detected object in a computer-based space situational awareness system is disclosed. The method utilizes a computer-based space situational awareness system including a database of space object information and subject matter expert information, and the sensor space situation awareness system communicates with a sensor fusion system for detecting an object in an exo-atmospheric space being monitored. The method comprises: automatically receiving sensor information data corresponding to a detected object in the exo-atmospheric space being monitored; searching the database and elsewhere, in response to received sensor information data, for corresponding data to the received sensor information data; reasoning to identify the object as a known object or unknown object; and reasoning, using various databases, additional open source materials, and subject matter expert information, a threat capability and probability posed by the known or unknown object to other objects in the exo-atmospheric space being monitored.

Optionally the method may further include generating a threat profile report for the known or unknown object, presenting the threat profile report to a person, and sending the evaluation to a computer implemented course of action generating module. Reasoning about threat capability and probability posed by the known or unknown object may involve considering multiple hypotheses of potential threat capabilities and motive for the reasoned identity; and considering diplomatic, intelligence, military and economic (DIME) information corresponding to the reasoned identity to determine the most probable threat capability and probability. Reasoning to identify the object as a known object or unknown object may involve consulting space catalog information, considering kinematic information for the detected object to deduce the most probable identity of the detected object, and considering other available information potentially characterizing the object. Reasoning about the identity of the object as a known object or unknown object may involve comparing the received sensor information data to data corresponding to known satellites, and matching the received sensor information data to one of the known satellite objects to identify the object or designating the object as an unknown object and create a new data profile for the unknown object for future analysis.

An embodiment of a computer-based space situational awareness system for evaluating detected objects in a region of exo-atmospheric space is also disclosed. The system includes a database populated with space object information and subject matter expert information for space objects. The system is adapted to receive input data from a sensor fusion system for a detected object in the exo-atmospheric space, and autonomously evaluate a potential threat presented by the detected object in the exo-atmospheric space.

Optionally, the system may be adapted to probabilistically determine a presence of a threat, a type of threat; the danger of the threat, and an intent of a controlling entity in order to evaluate the potential threat. The system may also predicatively analyze, via consideration of multiple threat scenario hypotheses supported by information in various databases and additional open source materials, a most probable threat scenario for the detected object. The system may utilize diplomatic, intelligence, military and economic (DIME) information stored in various databases and additional open source materials. The system may include evaluation of means, motive, opportunity and suspicion factors in order to analyze detected objects. The detected object may be a satellite.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF MODULES, METHODS AND SYSTEMS

Exemplary embodiments of computer-implemented threat assessment modules, space situational awareness systems and methods of evaluating threat scenarios posed by detected objects in space are disclosed herein that overcome problems, difficulties and disadvantages with existing systems and methods for administering counterspace operations. More specifically the assessment modules, systems and methods address complex problems associated with analyzing, for example, an existence and nature of a threat posed by a detected object in an exo-atmospheric space. These problems, discussed below, are overcome at least in part with the provision of networked computer systems, modules, and predictive analysis methods for analyzing detected objects and potential threats posed by detected objects in the exo-atmospheric space. Data and information related to space objects, including information contributed by subject matter experts, are archived in the system databases, and with probabilistic reasoning analysis and algorithms, the system weaves together disparate pieces of data and information to deduce a most probable threat scenario from a number of possible threat scenarios posed by a detected object. Human error and bias in the threat analysis and evaluation is largely, if not completely avoided, and real time threat analysis is performed efficiently and optimally in computer time as opposed to human time. Threat information generated by the system may be available in summary form or detailed form for use by a human decision maker or another portion of the system to determine a most appropriate course of action to respond to an analyzed threat.

In order to appreciate the inventive concepts to their fullest extent, the following disclosure will be divided into different parts or segments, wherein Part I discusses particular problems of assessing potential threats of detected objects in space; Part II discloses an exemplary system and module for assessing threats posed by detected objects discussed in Part I and for administering counterspace operations; and Part III discloses exemplary processes utilized by the system of Part II to complete its analysis of threat scenarios.

I. Introduction

Counterspace Operations have defensive and offensive elements, both of which depend upon robust space situation awareness. Counterspace functions are executed to protect military and friendly assets while denying space capability to adversaries. Counterspace Operations are broken down into three specific areas: Space Situation Awareness (SSA); Defensive counterspace; and Offensive counterspace.

Space Situation Awareness relates to knowledge about space-related conditions, constraints, capabilities, and activities directed in, from, toward, or through space. Defensive counterspace relates to the preservation of friendly asset ability to exploit space to its advantage via passive and active actions to protect friendly space-related capabilities from enemy attack or interference. Offensive counterspace relates to precluding an adversary from exploiting space to their advantage. Offensive and defensive counterspace operations are largely dependent on adequate Space Situational Awareness for a space domain, such as a region of an exo-atmospheric space, that is being monitored.

A space domain intelligence analyst needs to quickly respond to developing threat situations by analyzing evolving situations in three dimensional space, determining enemy intent and capabilities of objects in the space, and then selecting an appropriate course of action (COA) to protect friendly space assets. Tools that accelerate and simplify this process while reducing errors and bias are highly desired.

Existing analysis solutions to achieve space situational awareness and produce actionable intelligence are manual in nature, and rely in large part upon timely access to a limited number of human experts. Such access to experts in various locations is difficult to provide in real time to a human analyst or decision maker. Consequently, comprehensive analysis necessary to achieve sufficient space situational awareness tends to be slow and manpower-intensive.

Some automated tools are available that perform limited functions such as kinematic analysis to provide helpful information to an analyst interpreting situations, but it remains largely up to the perception of human analysts to make any conclusions regarding observed behaviors of objects and their implications on a threat analysis. Visualization tools also exist that provide a situational picture for humans to analyze, but this human analysis process is presently generally unassisted by any artificial computational intelligence.

Because the analysis is largely, if not entirely dependent on the mental faculties of human beings, the quality of space situational awareness analysis for any given situation tends to be limited by the knowledge and capability of specific personnel, and is also subject to their personal biases. While standard processes exist to guide the analysis process, and some aspects of the process have been automated, the primary burden falls on the analyst(s) on call, and ultimately their conclusions are predicated mostly upon their own personal experience and judgment. The quality of analysis performed, and the accuracy of any results, may therefore vary among different persons that may be involved in the analysis at any given time, and varying analysis may likewise lead to considerably different courses of action to be undertaken for otherwise similar events. Such varying interpretation of the same events by different groups of people are undesirable, and it would be beneficial to provide a more consistent and unbiased space situational awareness analysis that decision makers could more effectively use to administer counterspace measures, both offensive and defensive.

Of chief concern for purposes of space situational awareness is a thorough understanding of the objects in the space and to what extent they pose a threat to friendly assets in the space domain. Complex issues are associated with analyzing potential threats associated with objects in the space domain. First, a large number of objects are typically present simultaneously in the space, and the ability of the objects to move within the space presents dynamic and sometimes rapidly evolving situations for analysts to assess. Multiple explanations may exist for the presence and behavior of some objects in the space, some pointing toward a conclusion that an object is hostile and some pointing toward a conclusion that the object is non-threatening. Properly balancing alternative views of the same events in space and arriving at a conclusion one way or the other, as well as predictively analyzing such situations as they unfold, is daunting to say the least. The consequences of incorrectly identifying threats, or in falsely identifying threats, can be grave.

Because of the difficulty involved with interpreting and analyzing dynamic situations in the space domain, as well as the implications and consequences of an error in the analysis, human intelligence analysts must perform under great stress and pressure in certain situations. Such stress and pressure, as well as time constraints to make a decisions, may cause any given analyst to overlook aspects of the analysis or relevant data that he or she otherwise would have considered, or otherwise err in some portion of the analysis. Also, personal biases of human analysts may become more prevalent and more influential to ultimate conclusions made in times of great stress. Such bias may be subconscious to the analysts, and is practically impossible for other analysts and decision makers to appreciate or account for in their view of an analysis conducted.

Finally, aside from possible effects of personal bias, state of mind (e.g., tiredness, distraction, short attention span) of human analysts can negatively affect the analysis results and distort their conclusions.

Automated tools to assist with a uniform and unbiased analysis that avoids these and other disadvantages would be highly desirable for analyzing potential threats posed by objects in a space domain.

II. Exemplary Space Situational Awareness Systems and Modules

Embodiments of artificially intelligent computer-implemented systems facilitating an automated approach to identifying and evaluating potential threat scenarios in a space being monitored for counterspace purposes are disclosed hereinbelow. The intelligent systems provide a more robust, cost-effective solution to many of the problems associated with Space Situational Awareness/Space Control, at least some of which are discussed above. The systems and modules are fully capable and autonomous decision aiding tools that rapidly analyze potential threats posed by detected objects by assessing potentially threatening capabilities and suspicious actions presented by the object; assessing a potential of hostile intent of the entity controlling the detected object (e.g., foreign government, terrorist group, etc.); and even analyzing potential courses of actions and options to respond to detected objects.

As will be appreciated, the intelligent systems incorporate up-to-date knowledge and experience of multiple human persons having specialized knowledge and experience in both the space domain being monitored and general intelligence analysis, referred to hereinafter as "subject matter experts". As such, the system allows personnel having lesser experience to fully benefit from the knowledge of a team of experienced subject matter experts in real time. By using such extensive subject matter expert information, the intelligent systems provide alternative explanations and action choices that certain personnel might not have considered due to gaps in their personal knowledge or experience. The intelligent systems also greatly accelerate the threat analysis process by acquiring and analyzing needed information (and flagging needed but unavailable information) at computer speed rather than human speed, which provides better actionable intelligence, much quicker to the decision maker(s). A broader, more robust analysis is therefore possible for identifying and analyzing potential threat scenarios in a space being monitored. The intelligent systems are also consistent and unbiased in the approach to the analysis.

In addition to the threat analysis process being automated in the intelligent systems disclosed, allowing organized, actionable intelligence and potential responses to the situation to be determined much more quickly, the threat analysis can be run iteratively, in real-time, as objects enter the space or move within it to provide a continuously updated threat analysis for objects in the space. That is, the threat analysis is itself dynamic, allowing new information to be incorporated in the analysis as it becomes available, and accounting for changes occurring in the space domain over time.

Figure 1:
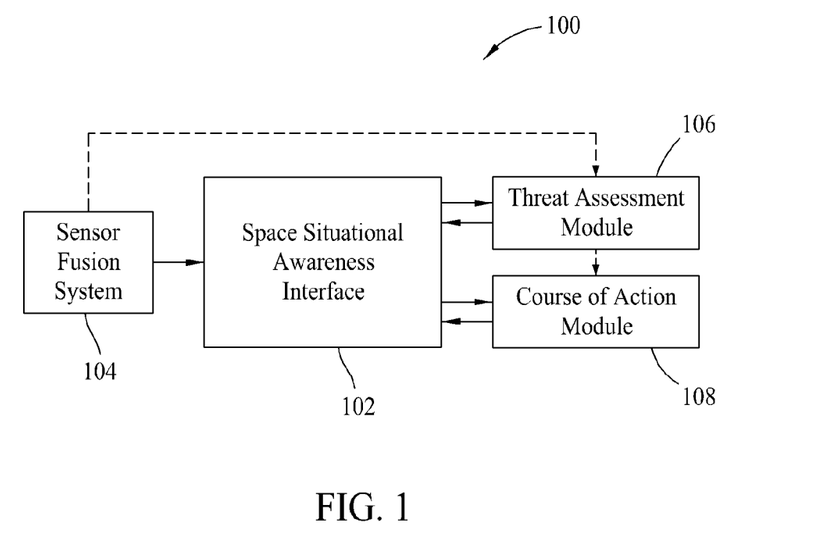
FIG. 1 is a schematic diagram of a computer-based space situational awareness system.
Figure 2:
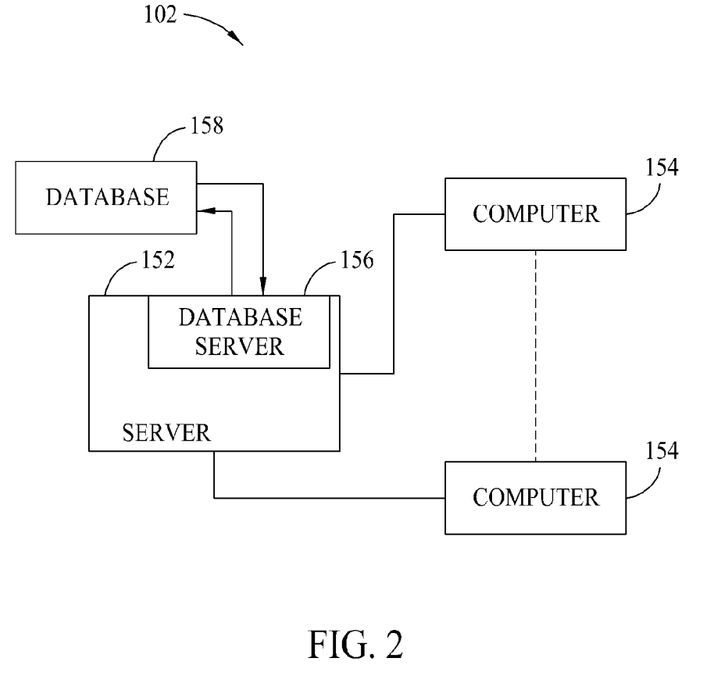
FIG. 2 is a simplified block diagram of an exemplary embodiment of a portion of the system shown in FIG. 1.
Figure 3:
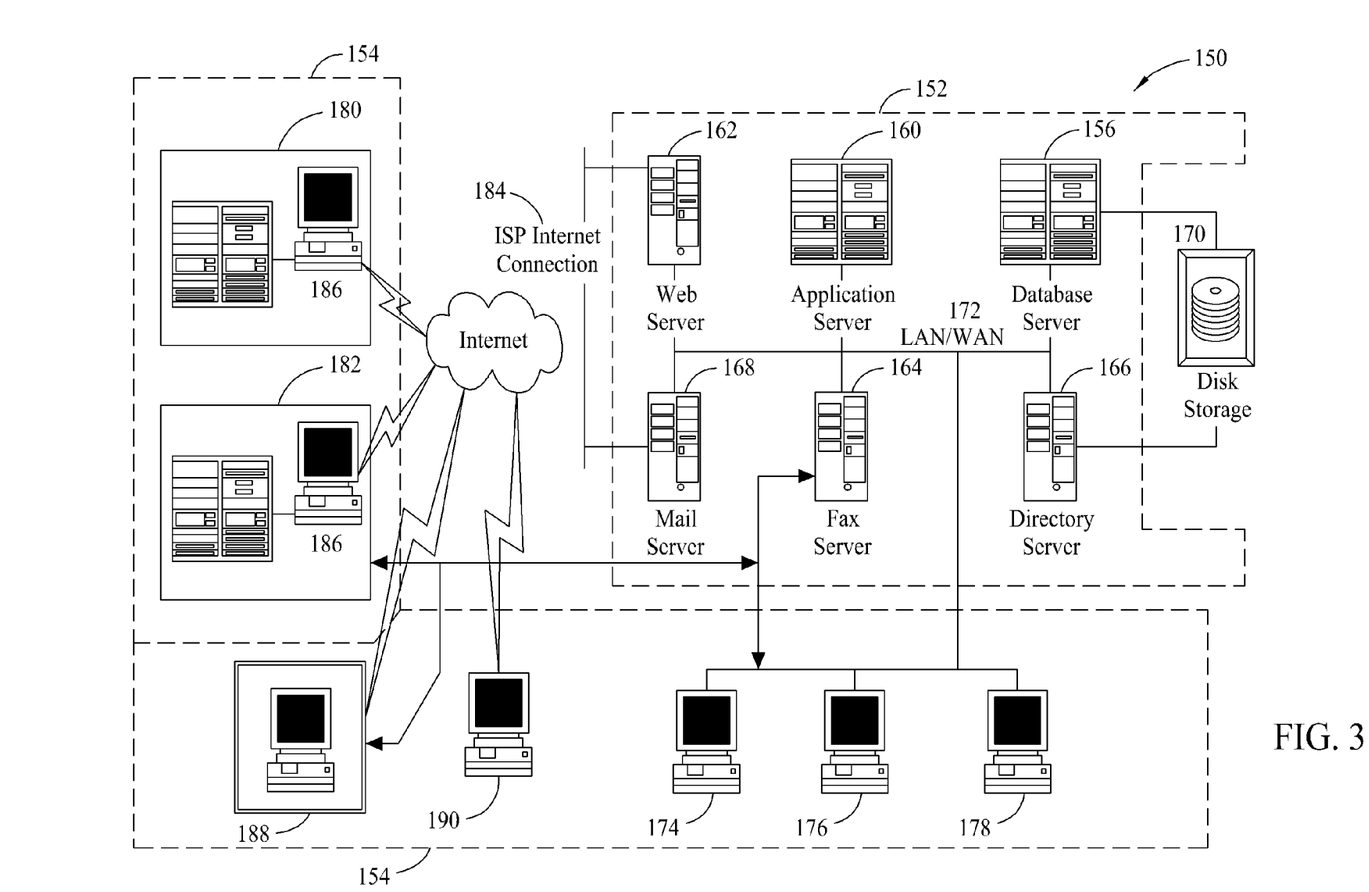
FIG. 3 is an expanded block diagram of an exemplary embodiment of a server architecture of the portion of the system shown in FIG. 2.

FIGS. 1-3 illustrate aspects and portions of an exemplary space situational awareness system 100 that may be implemented as one or more computer program(s) or software embodied on a computer readable medium and utilizing, for example, a Structured Query Language (SQL) with a client user interface front-end for administration and a web interface for user input, access, and information retrieval and reports by persons interested in assessing and evaluating, for example, threat scenarios and information relating to detected space objects in an exo-atmospheric space being monitored The space situational awareness system 100 may be, for example, web enabled and may be run on a business-entity intranet or alternatively may be fully accessed by individuals having an authorized access outside the firewall of the business-entity through the Internet. In an exemplary embodiment, the space situational awareness system 100 may be run, for example only, in a UNIX® operating environment or operating system, a Windows® NT environment or operating system that is commercially available from Microsoft Corporation of Redmond, Wash., or another operating environment or operating system known in the art. The application may be flexible and designed to run in various different environments without compromising any major functionality.

As shown in the illustrative embodiment of FIG. 1, the space situational awareness system 100 may include a space situational awareness interface 102, described in detail further below, in communication with a sensor fusion system 104 for detecting the presence of objects in the space being monitored for counterspace operations. The sensor fusion system 104 includes well known sensing technology that signals data to the space situational awareness interface 102 as inputs, and as such the sensor fusion system 104 will not be described in detail herein. Such data and information input to the space situational awareness interface 102 may include dimensional data for a detected object; position coordinates in three dimensional space for the object; kinematic information such as velocity, acceleration, and direction of movement for a detected object; identification data, if available, and/or other object information.

The space situational awareness interface 102 receives data inputs from the sensor fusion system 104 and processes them to produce actionable intelligence to administer counterspace operations. Such processing may utilize a computer-implemented threat assessment module 106 and a computer-implemented course of action module 108. The threat assessment module 106 receives data and information from the sensor fusion system 104 and evaluates whether detected issues pose a threat to other objects in the space and the nature of the threat. As will be appreciated below, the threat assessment module 106 quickly, efficiently, and intelligently reasons through a comprehensive threat analysis and generates an unbiased, probabilistic threat profile and reports for a human analyst to consider. The threat assessment module 106 simultaneously entertains multiple hypotheses for interpreting the presence and/or behavior of a detected object, and reasons through potentially conflicting evidence to determine a most probable explanation of the detected object as threatening or non-threatening. If a detected object is reasoned to be threatening, the nature of the threat is identified, and supporting evidence is provided to the analyst in the form of a report, which may include supporting evidence to justify the conclusion.

The course of action module 108 may be utilized to analyze the results of the threat assessment module 106 and determine a most appropriate, probabilistic course of action in response to detected objects and their observed behavior. Courses of action may include no action, a friendly action or a non-friendly action. Course of action modules 108 are known in the art and are not described in further detail herein.

While the threat assessment module 106 and the course of action module 108 are illustrated as separate features from the space situational awareness interface 102 in FIG. 1, it is appreciated that they could be combined with one another or with the space situational awareness interface 102 in other embodiments. That is, the space situational awareness interface 102, the threat assessment module 106, and the course of action module 108 may reside on the same or different computer machines or hardware equipment. Alternatively stated, the threat assessment module 106 and the course of action module 108 may be provided as add-on software packages to be used in conjunction with the space situational awareness interface 102 or may be bundled or integrated with the software of the space situational awareness interface 102. As also shown in FIG. 1, the sensor fusion system 104 may communicate directly with the threat assessment module 106 if desired, and the threat assessment module 106 may communicate directly with the course of action module 108 in different embodiments.

FIG. 2 is a simplified block diagram of an exemplary embodiment of the space situational awareness interface 102 including a server system 152, and a plurality of client sub-systems, also referred to as client systems 154, connected to the server system 152. Computerized modeling and grouping tools, as described below in more detail, are stored in the server system 152 and can be accessed by a requester at any one of the client systems 154. In one embodiment, the client systems 154 are computers or other electronic devices including a web browser, such that the server system 152 is accessible to the client systems 154 using, for example, the Internet.

The client systems 154 may be interconnected to the Internet through many interfaces including, for example, a network such as a local area network (LAN) or a wide area network (WAN), dial-in-connections, cable modems and special high-speed ISDN lines. The client systems 154 may be any device capable of interconnecting to the Internet including a web-based phone, personal digital assistant (PDA), or other web-based connectable equipment or equivalents thereof. A database server 156 is connected to a database 158 containing information on a variety of matters, as described below in greater detail. In one embodiment, the database 158 is centralized and stored on the server system 152, and the database 158 can be accessed by potential users at one of the client systems 154 by logging onto the server system 152 through one of the client systems 154. In an alternative embodiment, the database 158 may be stored remotely from server system 152 and may be non-centralized.

FIG. 3 is an expanded block diagram of an exemplary embodiment of a server architecture of the space situational awareness interface 102 including the server system 152 and the client systems 154. The server system 152 may include the database server 156, an application server 160, a web server 162, a fax server 164, a directory server 166, and a mail server 168. A disk storage unit 170 may be coupled to the database server 156 and the directory server 166. The servers 156, 160, 162, 164, 166, and 168 may be coupled in a local area network (LAN) 172. In addition, a system administrator's workstation 174, a user workstation 176, and a supervisor's workstation 178 may be coupled to the LAN 172. Alternatively, workstations 174, 176, and 178 may be coupled to LAN 172 using an Internet link or are connected through an Intranet.

Each workstation 174, 176, and 178 may be a personal computer or other electronic device having a web browser. Although the functions performed at the workstations typically are illustrated as being performed at respective workstations 174, 176, and 178, such functions may be performed at one of many personal computers coupled to the LAN 172. Workstations 174, 176, and 178 are illustrated as being associated with separate functions only to facilitate an understanding of the different types of functions that can be performed by individuals having access to the LAN 172.

The server system 152 in one embodiment is configured or adapted to be communicatively coupled to various individuals via some of the client systems 154, including human intelligence analysts 180 associated with the space situational awareness interface 102, and to third parties 182, such as subject matter experts for space objects and intelligence analysis, in communication with the server system 152 using, for example, an ISP Internet connection 184. The communication in the exemplary embodiment is illustrated as being performed using the Internet, however, any other wide area network (WAN) type communication can be utilized in other embodiments. That is, the space situational awareness interface 102, and its operating algorithms and processes described below are not limited to being practiced using the Internet.

In an exemplary embodiment, any authorized individual having a workstation 186, 188 can access the server system 152 via one of the client systems 154. At least one of the client systems 154 includes a manager workstation 188 located at a remote location. Workstations 186 and 188 may be personal computers or other electronic devices having a web browser. Additionally, still other authorized parties may communicate with the server system 152 via a workstation 190 having, for example, a web browser.

The fax server 164 may communicate with remotely located client systems 154, including the workstations 186, 188 and 190. The fax server 164 may be configured or adapted to communicate with other client systems including but not limited to the workstations 174, 176 and 178 as well for reporting purposes.

The functionality and programming of the system is explained in detail below with respect to the methods and processes described below

III. Exemplary System Methods and Processes

The technical effect of the processes and systems described herein is achieved when data and information pertaining to space objects is gathered, compiled, entered, transmitted, downloaded or otherwise accepted by the space situational awareness interface 102. The data and information used by the space situational awareness interface 102 may be supplied and accepted through any of the workstations connected to the server system 152 as described above, or may be supplied or otherwise gathered from other sources if desired. Exemplary data and information utilized by the system is described in some detail below.

Figure 4:
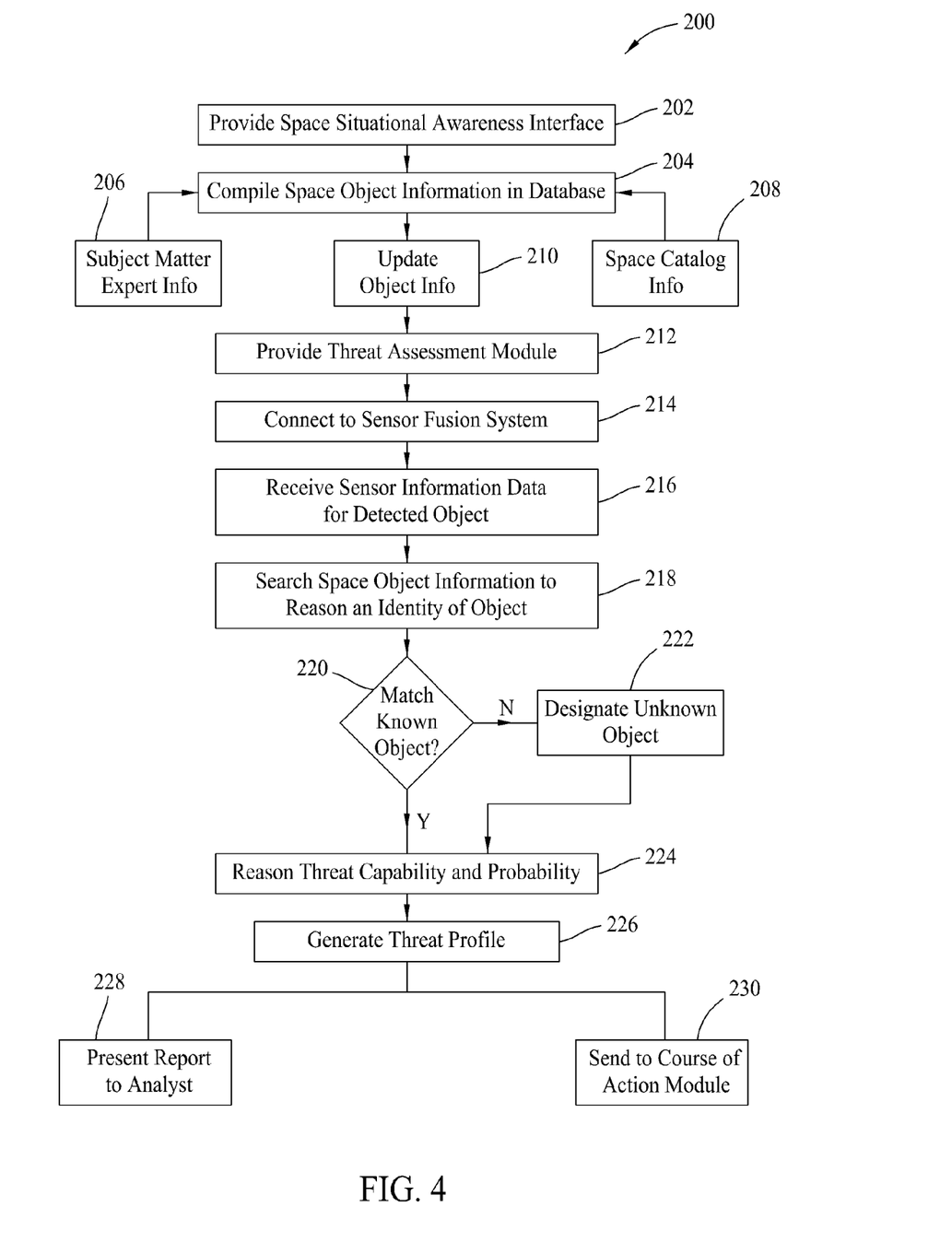
FIG. 4 is an exemplary flowchart of a method for assessing a potential threat scenario posed by detected objects in a space.

FIG. 4 is an exemplary method flowchart of a method 200 for evaluating an existence of a threat posed by a detected object in a computer-based space situational awareness system, such as the system 100 disclosed above. The method utilizes a computer-implemented space situational awareness interface, such as the system 102 described above including a database 158 (FIG. 2). Accordingly, the method includes providing 202 the space situational awareness interface and compiling 204 space object information that may be used to analyze space situational awareness situations. The space situational awareness interface may be provided with various known probabilistic and statistical algorithms familiar to those in the art and that have previously been manually applied by human analysts to determine probabilistic conclusions regarding observed events or predictive estimates of future events that have not been observed.

Compiling 204 the information may include obtaining information 206 from reliable human subject matter experts on space objects and intelligence analysis, and uploading, transmitting or otherwise transferring the information into the system database. Various subject matter experts may gather diplomatic, intelligence, military and economic (DIME) information from around the world that relates to potential threat analysis, but may not be otherwise centrally located and accessible for a human analyst for the space situational awareness system. Alternatively, the system may autonomously search for and gather the pertinent information itself, either from open sources or classified databases, for example. As such, in some embodiments the system is not entirely reliant upon its own database and internal information therein to conducts in analysis, and may consider materials, data, and information that are found in other databases, sources and materials external to the system database to complement information that it already possesses in the system database. The database may be periodically or continuously updated 210 with subject matter expert information and other information that may be compiled as new information becomes available so that most current information may be taken into account for analysis purposes by the system. Because of the nature of the subject matter expert information, much of it may not be verifiable or confirmed as true or false, and accordingly it may be accompanied by a confidence or belief factor indicating a probability that the information is actually true and correct. Other information utilized in the analysis includes similar confidence or belief factors that are accounted for in the analysis of potential threat scenarios.

Compiling 204 the information may also include obtaining space catalog information 208 and uploading, transmitting or otherwise transferring the space catalogue information for known objects. Such space catalog information may include, among other things, where available, unique identifiers for each known object (friendly and non-friendly), equipment feature information for each known object, performance and specification data for each known object, owner and control information for each known object, and historical behavior information for each known object. The database may be periodically or continuously updated 210 with space catalog information and compiled as new information becomes available so that the most current information may be taken into account for analysis purposes by the system.

The method 200 optionally includes providing 212 the threat assessment module if not already incorporated into the space situational awareness interface provided in step 202.

The method 200 further includes connecting 214 the space situational awareness interface 102 with a sensor fusion system for detecting an object in an exo-atmospheric space being monitored so that the sensor fusion system can communicate with the space situational awareness interface and provide data and information inputs to the space situational awareness interface. After connecting 214 to the sensor fusion system, the space situational awareness interface may automatically receive 216 sensor information data corresponding to a detected object in the exo-atmospheric space being monitored. When sensor information is received 216, the database of space object information is automatically searched 218, without any input of a human operator or analyst associated with the system, for corresponding data to try and identify the detected object.

Using the space object information in the database, the threat assessment module reasons through the various possibilities for the detected object, and either matches 220 the received sensor information to the detected object, or designates 222 the object as an unknown object. The module then reasons 224, using the database and subject matter expert information, a threat capability and probability posed by the known or unknown object to other objects in the exo-atmospheric space being monitored.

Once an identity of the object is reasoned or the object is deemed to be unknown, the module may generate 226 a threat profile report for the known or unknown object. The threat profile report may be presented 228, via display, or via electronic or hard copy to a human person such as an analyst for the space situational awareness system. The threat profile report may also be sent, transmitted, or otherwise provided 230 to a course of action module for formulation of an appropriate response to the threat profile. The threat profile report includes information regarding a potential threat scenario posed by the object, chiefly the existence of a threat in probabilistic terms and the nature of the threat, also in probabilistic terms. That is, the existence of a threat may be estimated on a scale of zero to 100% probability, and the nature of the threat may likewise be evaluated on a scale of zero to 100% probability. Of course, other information may be included in the threat profile report as will become apparent below.

The reasoning performed in steps 216 and 224 is believed to be unique in comparison to many known computational computer systems. The reasoning involves consideration of multiple hypotheses at the same time, looking for evidence in multiple databases and in additional open source materials to confirm or negate each hypothesis, and ultimately to arrive at the best hypothesis that probabilistically meets the evidence found. That is, the module searches for and arrives at the hypothesis that is more likely to be true versus any other hypothesis considered, and ultimately uses that hypothesis as the basis to generate the threat profile report. Additionally, the computer-based reasoning based on data derived from multiple human subject matter experts to evaluate hypotheses is believed to be unique in comparison to existing computer systems.

For example, the reasoning 218 of the identity of the object may include consulting space catalog information in the database, and considering and comparing kinematic information for the detected object to deduce the most probable identity of the detected object, even though an exact match between the space catalog information and the received sensor information data may not be found. As such, the module may overlook some discrepancies between received sensor information and the space catalog information to probabilistically match a detected object to a known object. Alternatively, the module may probabilistically rule out otherwise matching known objects based on comparison of kinetic information in the received sensor information and data to the performance capabilities of the known objects that are cataloged. For example, in the case of a detected satellite, the reasoning step 216 may include comparing the received sensor information data space object information in the catalog to determine likely matches, as well as eliminate objects in the space catalog that are not capable of meeting the observed kinetic data or other observed feature or capability of the detected object.

The ability of the module to analyze unknown objects is also believed to be unique in comparison to existing computer systems. When no likely match can be found with space object information in the database, a new data profile can be created for the unknown object and it may continue to be analyzed with other information in the database, such as the subject matter expert information, or other newly added information in one of the database updates. In such a manner, the module can index and identify objects apart from information originally presented to it when the interface is provided in step 202 or when the threat assessment module is provided in step 212. The module is fully capably of analyzing and developing threat profiles for previously unrecognized objects.

The threat profile report generated as step 226 may include, for example, a confidence number or interval indicating the probability that the conclusion is true. For example, a report of "Threat potential 75%" indicates that according to the evidence presented to the system there is a 75% chance that the object is, in fact, a threatening object. The threat profile may further include supporting evidence and information on which the threat assessment is based in varying amounts of detail for the analyst or other decision maker. The threat profile may also include, as will be seen below, threat intent information. Various examples are provided below that are believed to illustrate some of the different types of evidence considered and types of reasoning employed. As will be seen below, in one example, the module factors into its reasoning an evidentiary basis of a means to execute a threatening action, an evidentiary basis of a motive to execute a threatening action, and/or an evidentiary basis to conclude the object is behaving suspiciously. Other evidentiary factors may be employed for purposes of the reasoning in other further and/or alternative embodiments.

Figure 5:
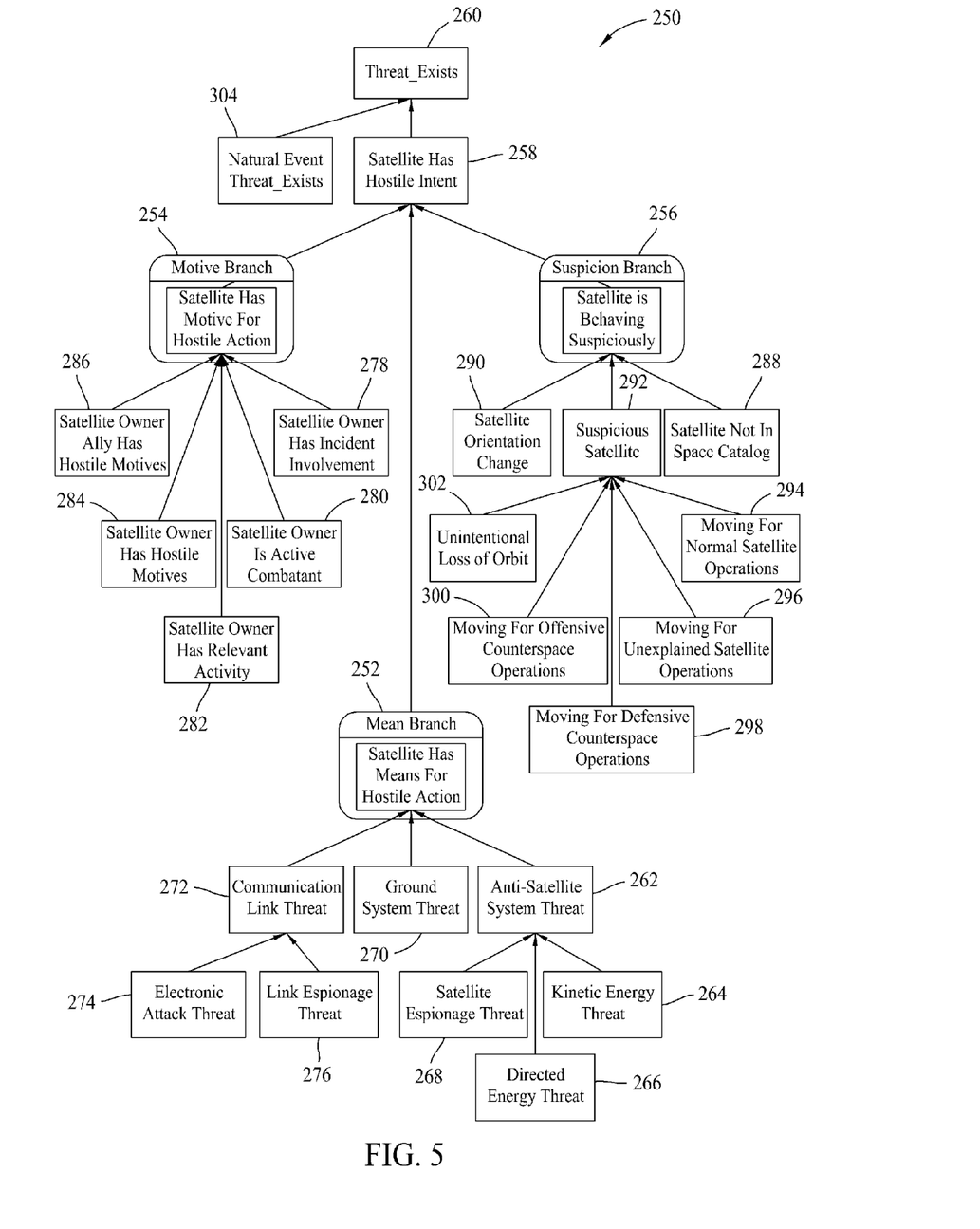
FIG. 5 is an exemplary system state graph illustrating exemplary information maintained by the system shown in FIGS. 1-3 and implementing the method shown in FIG. 4.
Figure 6:
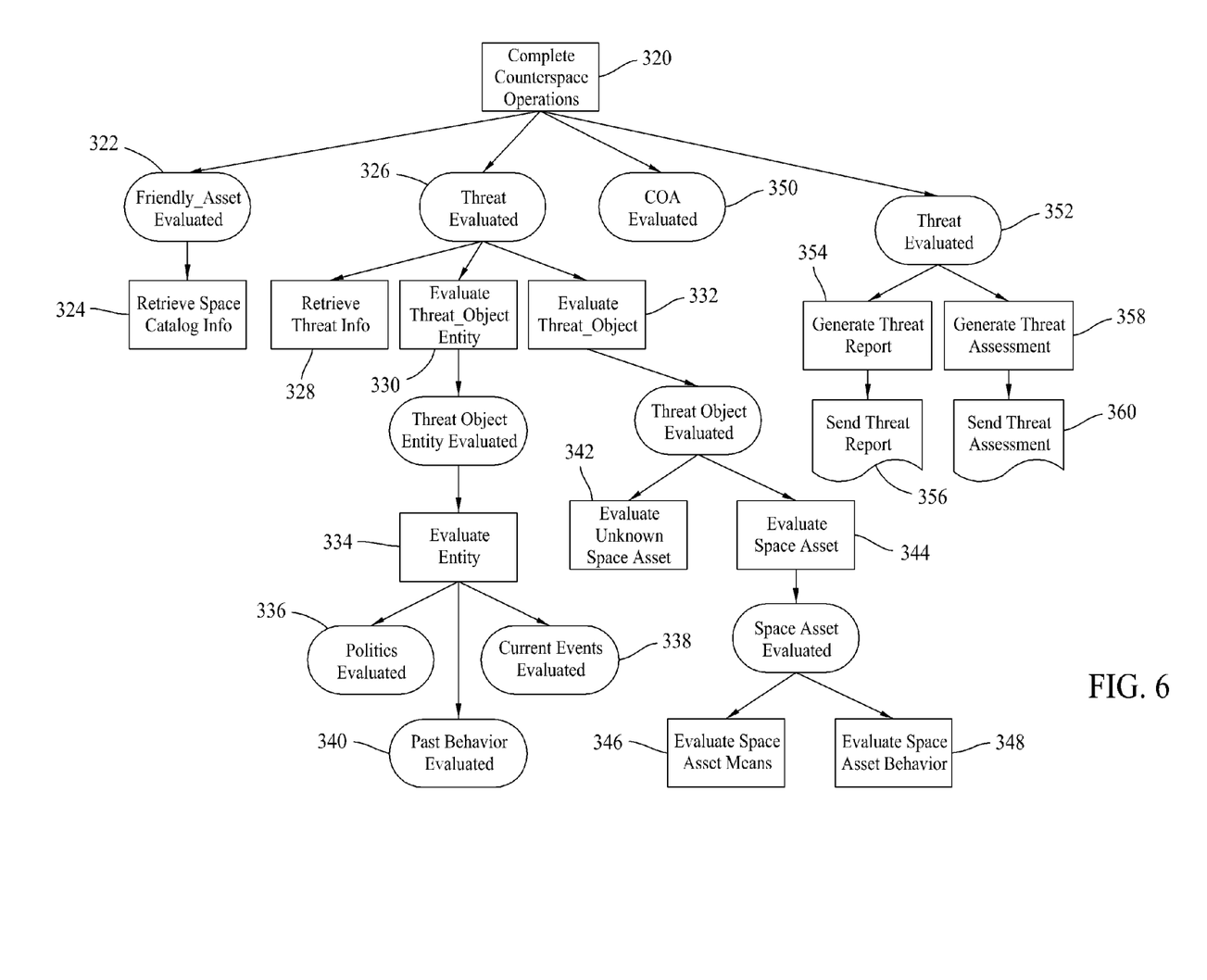
FIG. 6 is an exemplary process graph illustrating exemplary processes executed by the system shown in FIGS. 1-3 and implementing the method shown in FIG. 4.

FIGS. 5 and 6 provide simplified pictures of the structure of the core knowledge components contained within the threat assessment module 106 (FIG. 1) utilized by the space situational awareness interface 102 in one exemplary embodiment. The knowledge base may be implemented, for example, in Plan Goal Graphs (PGGs) and Concept Node Graphs (CNGs) using PreAct® software of Applied Systems Intelligence, Inc. of Alpharetta, Ga. PGGs consist of alternating layers of plans and goals that represent a hierarchical decomposition of purpose. This generally represents the process a human would execute without the intelligent agent being present. At the lowest level of the PGG are scripted actions which allow the system to affect or sense the external world. CNGs are directed acyclic graphs which store, abstract and aggregate data about the state of the world. The CNG represents both a theoretical or template (domain) view of the world, and a current, instantiated state of the world. Many parallel instantiations (models) can be run at once by the threat assessment module 106, evaluating the evidence supporting alternative theories or explanation for the presence and behavior of detected objects. Reasoning about the domain (including sensing and acting) occurs as a result of the instantiation of knowledge base components. The knowledge base may be implemented, for example, using an ASI PreAct® cognitive engine of Applied Systems Intelligence, Inc. of Alpharetta, Ga. although it is appreciated that another underlying structure could alternatively be used, including but not limited to another off-the-shelf symbolic computation engine, or a customized, application specific software package.

Using a graphically-based reasoning process, the approach captures the requisite algorithmic knowledge in terms of plans and goals in one graph, which represents the process followed, and in terms of concepts in a second graph which is a template used to represent the state of the world being monitored and reasoned upon by the intelligent threat assessment module. These two graphs interact with each other causing the module to perform its threat assessment analysis. As new information is sensed, the concept graph receives the information and reasons with it, causing new plans and goals to be executed to support information needs of the system.

FIGS. 5 and 6 are provided for overview purposes to provide a representative flavor of the processes utilized in the threat assessment module 106. It is noted that the exemplary graphs of FIGS. 5 and 6 are directed to particular issues associated with detecting, identifying and analyzing potential threats posed by satellites in an exo-atmospheric space. It is contemplated, however, that similar methodology may be utilized in further and/or other embodiments to identify and analyze threats posed by other non-satellite objects in space.

FIG. 5 provides a simplified system state graph 250 which captures the state of the world (domain) relevant to the space situational awareness interface 102 (FIGS. 1-3). This structure is populated with evidence accumulated during processing, which provides indications of the level and type of threat, etc.

As shown in FIG. 5, the exemplary system state graph 250 utilizes three branches to analyze whether or not a threat exists for a detected satellite object, although more or less branches may be provided in other embodiments as desired or as needed. In the illustrative embodiment shown in FIG. 5, the threat assessment module includes a means branch 252 that evaluates whether a satellite has a means for hostile action, a motive branch 254 that evaluates whether a motive for executing a hostile action is present, and a suspicion branch 256 that evaluates whether the satellite is behaving suspiciously. By reasoning through the three branches 252, 254 and 256, the module forms a basis for concluding, or not concluding, that a hostile intent actually exists 258 and a likelihood of threat exists 260 for a detected satellite.

Considering first the means branch 252, the module, using the database 158 (FIG. 2) of the space situational awareness interface 102, assesses the evidence in the database relating to the presence or absence of features of the satellite possessing certain types of threat capability. Probabilistic information regarding such features capable of executing threatening action may be found in the space catalog information, the subject matter expert information, other information in various databases, and additional open source materials and databases. Considering the example of FIG. 5, the means branch 252 includes checks for anti-satellite system threat capability 262, including but not limited to kinetic energy threat capability 264, directed energy threat capability 266, and satellite espionage threat capability 268. Still other anti-satellite threat capabilities are possible and may be within the scope of the module to assess in further and/or alternative embodiments.

Also in the example shown in FIG. 5, the means branch 252 includes an assessment of ground system threat capability 270 and communication link threat capability 272 such as electronic attack threat capability 274 and link espionage threat capability 276. Still other communication link threat capabilities are possible and may be within the scope of the module to assess in further and/or alternative embodiments. Also, various sub-types or categories of ground system threats may be accounted for in further and/or alternative embodiments.

In addition to assessing threat capability in the means branch 252, the module further searches the database(s) and additional open source materials for information pertaining to motives for hostile action for the detected satellite. Probabilistic information regarding such evidence of a hostile motive may be found in the space catalog information, the subject matter expert information, other information in various databases, and/or other information in various open source materials. As shown in FIG. 5, evidence of a hostile motive considered in the motive branch 254 may include evidence that the satellite owner has involvement in another threatening incident 278, evidence that the satellite owner is an active combatant 280, evidence that the satellite owner has relevant activity 282 pointing toward hostility, direct evidence that the satellite owner has a hostile intent 284, and evidence that the satellite owner has a hostile motive 286. Still other evidence may be considered in further and/or alternative embodiments to evaluate whether a hostile motive exists.

As further shown in the example of FIG. 5, the suspicion branch 256 evaluates whether the detected satellite is behaving suspiciously. Probabilistic information regarding such evidence of suspicious behavior may be found in the space catalog information, the subject matter expert information, other information in various databases, or in additional open source materials. As shown in FIG. 5, evidence of suspicious behavior considered for the suspicion branch 256 may include evidence that the satellite is not catalogued 288, evidence that the satellite orientation has changed 290, and evidence of suspicious action 292. The evidence of suspicious action 292 may include consideration of evidence that the satellite is moving for normal satellite operation 294, evidence that the satellite is moving for an explained operation 296, evidence that the satellite is moving for defensive counterspace operations 298, evidence that the satellite is moving for offensive counterspace operations 300, and evidence of an unintentional loss of orbit 302.

It is noteworthy that some of the hypotheses considered in the branches 252, 254 and 256 point toward a conclusion of the existence of a threat while other hypotheses considered point away from a conclusion of a threat. That is, some of the hypotheses in the branches 252, 254 and 256, if supported with evidence in the database would apparently increase the likelihood of an existence of threat, and some of the hypotheses, if supported with evidence in the database would apparently decrease the likelihood of threat. Consideration of alternative hypotheses and conflicting evidence, and reasoning through all types of evidence is believed to be unique relative to most computational computer systems. As one example, a satellite object that is determined to have threat capability in the means branch 252 may not be considered a likely threat in the absence of a clear motive for hostile action evidenced in the motive branch 254 and when there is no evidence of suspicious activity as determined by the suspicion branch 256. The balancing of the three branches 252, 254, and 256, and all the evidence subsumed in the branches 252, 254, and 256 may attenuate or amplify specific concerns identified in any one branch. The branches 252, 254, and 256 therefore reflect a holistic view of all types of evidence, and aggregation of all evidence to arrive at a final conclusion.

It is also seen in FIG. 5 that, in addition to evaluating evidentiary bases relating to means, motive and suspicion, the module also includes consideration of evidence that a natural threat exists 304. Probabilistic information regarding such evidence of a natural threat may be found in the space catalog information, the subject matter expert information, other information in the various databases, or in additional open source materials.

FIG. 6 provides a simplified process graph 320 which shows how the system performs the function of analysis of situations as objects are detected and facilitates complete counterspace operations. Friendly assets may be identified and evaluated 322 when received sensor data matches space catalog information retrieved 324 from the database.

For unfriendly objects or unrecognized objects deemed by the module to be unknown, potential threats may be evaluated 326 on a number of levels. For example, threat information may be retrieved 328 from the space catalog apart from information in the database, where available, and factored into the analysis. The ownership entity of the threat object may also be evaluated 330, and the object itself may be evaluated using information in the database apart from the space catalog information.

In the example shown in FIG. 6, evaluating the threat object entity 330 may involve evaluation of the ownership entity and its allies or associates. That is, the module searches the various databases and open source materials for evidence of political connections and affiliations 336, evidence of current events 338 that increase or decrease a likelihood of threat potential, and evidence of past behavior 340 that may provide some insight and predictive value to anticipated responses to political and current events considered in steps 336 and 338. Probabilistic information regarding such evidence may be found in the space catalog information, the subject matter expert information, other information in various databases, or in additional open source materials. Of particular benefit here is the application of diplomatic, intelligence, military and economic (DIME) factors and information that may be included, for example, in the subject matter expert information in the database.

As seen in FIG. 6, evaluating the object 332 may involve evaluating an unknown asset 342 or a known asset or object 344 using information in the database. Probabilistic information serving as evidence of a threat may be found in the space catalog information, the subject matter expert information, other information in various databases, or information in additional open source materials. Such information may include data and information pertaining to consideration of hostile means 346, suspicious behavior 348, and also hostile motive as explained above in relation to FIG. 5.

Once a threat is comprehensively evaluated 326, the threat information may be used to evaluate a course of action 350 for responding to the threat and also processing the threat by generating a threat report 354, sending the threat report to interested parties 356, generating a threat assessment 358 and sending the threat assessment to interested parties 360.

Given the above type of knowledge structures illustrated in FIGS. 5 and 6, the space situational awareness system functions by sensing information provided via standard interfaces, and then dispatching actions to act upon the received information in order to achieve its goals. Upon receipt of a potential threat from fused sensor data, the system gathers intelligence from various sources and then evaluates the situation to provide actionable information to decision makers. This actionable information may include a threat profile, an analysis of potential courses of actions for the threat, and analysis of possible course of action responses to the threat.

The initial threat information received from the sensor systems does not generally identify the threatening object as a particular known space object, but rather provides a probability profile of potential matches to known space objects. The system develops a threat profile incorporating intelligence on all these various threat object matches so that possible courses of action for the threat are ordered by both likelihood and danger. The system then extends its analysis to incorporate diplomatic, intelligence, military and economic (DIME) factors so that intent and historical information are considered with appropriate adjustments then provided to threat likelihoods. By capturing the experience and judgment of multiple subject matter experts to automate this decision-making process, the speed of response is improved and the error rate decreased.

The system uses the threat profile it has developed for the situation to analyze possible actions for the threatening object. In generating the threat profile, the system considers historical information, capability assessments and political evaluations to assess the intent of the controlling entity (e.g., foreign government, terrorist organization) and assign probabilities to potential threat COAs. It also uses this profile to analyze proposed responses to the threat (i.e., potential friendly COAs), including an assessment of possible consequences for selected actions. This provides the decision maker with assistance not just from currently-present personnel, but also from the knowledge of subject matter experts which has been incorporated into the system database. Because the accumulated knowledge of multiple experts is the basis of the reasoning performed by the system, potential explanations for the situation that might not have been considered by the human team are proposed for consideration. The system alleviates human bias in both threat analysis and proposed response via analytic rankings of the potential choices and information on possible consequences. The analysis provides an indication of likely success and likely consequences (potentially unforeseen by the human operators) for all proposed sets of actions. Since the system is dynamic it can be used to rapidly re-plan in response to changing conditions in real time, and can be used for war-gaming in either an actual incident situation or a training environment.

The benefits and advantages of the concepts disclosed are now believed to be amply demonstrated in the various embodiments disclosed.

The modules, systems and processes described above are not limited to the specific embodiments described herein. Components of each module, system and each process can be practiced independent and separate from other modules, components and processes described herein. Each component and process also can be used in combination with other components, systems and processes.

While the modules, systems and methods disclosed have been described in terms of various specific embodiments, those skilled in the art will recognize that they can be practiced with modification within the spirit and scope of the claims.

What is claimed is:

1. A computer-implemented threat assessment module for a computer-based space situational awareness system, the space situational awareness system including a database populated with space object information and subject matter expert information for space objects, the space-situational awareness system receiving input data from a sensor fusion system corresponding to a detected object in an exo-atmospheric space, the threat assessment module including a processing device communicatively coupled to the database and adapted to process the input data for the detected object from the sensor fusion system to:
  reason, using the input data received at the processing device, an identity of the detected object in exo-atmospheric space as a known or unknown object;
  review, using the reasoned identity of the exo-atmospheric space object, as well as evidence information internal and external to the database that relates to the reasoned identity of the exo-atmospheric space object accessed by the processing device, the evidence information supporting a plurality of threat scenario hypotheses corresponding to the reasoned identity; and
  reason, by the processing device and using the reviewed evidence information, a most probable threat scenario from the plurality of threat scenario hypotheses that is supported by the evidence information.

2. The computer-implemented threat assessment module of claim 1, the module further adapted to supply the most probable threat scenario to a person.

3. The computer-implemented threat assessment module of claim 1, the module further adapted to supply the most probable threat scenario to a computer-implemented course-of-action module to evaluate potential responses to the most probable threat scenario.

4. The computer-implemented threat assessment module of claim 1, the module further adapted to factor in diplomatic, intelligence, military and economic (DIME) information corresponding to the reasoned identity when reasoning the most probable threat scenario.

5. The computer-implemented threat assessment module of claim 1, the module further adapted to:
  review evidence establishing a capability for executing a threatening action;
  review evidence establishing a hostile motive for undertaking a threatening action;
  review evidence establishing an opportunity to undertake a threatening action;
  review evidence indicative of suspicious behavior; and
  aggregate the evidence of capability, motive and suspicious behavior to generate the most probable threat scenario.

6. The computer-implemented threat assessment module of claim 1, the module further adapted to consider kinematic and space catalog information to deduce an identity of the detected object.

7. The computer-implemented threat assessment module of claim 1, the module adapted to identify and evaluate a potential threat posed by a satellite object.

8. A method for evaluating an existence of a threat posed by a detected object in a computer-based space situational awareness system, the method utilizing a computer-based space situational awareness system including a database of space object information and subject matter expert information, the space situational awareness system communicating with a sensor fusion system for detecting an object in an exo-atmospheric space being monitored, the method comprising:
  automatically receiving sensor information data corresponding to a detected object in the exo-atmospheric space being monitored;
  searching the database and elsewhere in response to the received sensor information data, for corresponding data to the received sensor information data;

reasoning to identify the object as a known object or unknown object; and reasoning, using various databases, additional open source materials, and subject matter expert information, a threat capability and probability posed by the known or unknown object to other objects in the exo-atmospheric space being monitored.

9. The method of claim 8, further comprising:

generating a threat profile report for the known or unknown object.

10. The method of claim 9, further comprising:

presenting the threat profile report to a person.

11. The method of claim 8, further comprising:

sending an evaluation to a computer implemented course of action generating module.

12. The method of claim 8, wherein reasoning the threat capability and probability posed by the known or unknown object comprises:

considering multiple hypotheses of potential threat capabilities and motive for the reasoned identity; and considering diplomatic, intelligence, military and economic (DIME) information corresponding to the reasoned identity to determine the most probable threat capability and probability.

13. The method of claim 8, further wherein reasoning the identity of the object as a known object or unknown object comprises:

consulting space catalog information;

considering kinematic information for the detected object to deduce the most probable identity of the detected object; and considering other available information potentially characterizing the object.

14. The method of claim 8, further wherein reasoning about the identity of the object as a known object or unknown object comprises:

comparing the received sensor information data to data corresponding to known satellites; and matching the received sensor information data to one of the known satellite objects to identify the object; or designating the object as an unknown object and create a new data profile for the unknown object for future analysis.

15. A computer-based space situational awareness system for evaluating detected objects in a region of exo-atmospheric space, the system including a database populated with space object information and subject matter expert information for space objects, the system adapted to:

receive input data from a sensor fusion system for a detected object in the exo-atmospheric space; and autonomously evaluate a potential threat presented by the detected object in the exo-atmospheric space.

16. The system of claim 15, wherein system is adapted to probabilistically determine a presence of a threat, a type of threat; the danger of the threat, and an intent of a controlling entity to evaluate the potential threat.

17. The system of claim 15, wherein the system is adapted to predictively analyze, via consideration of multiple threat scenario hypotheses supported by information in various databases and additional open source materials, a most probable threat scenario for the detected object.

18. The system of claim 15, wherein the system utilizes diplomatic, intelligence, military and economic (DIME) information stored in various databases and additional open source materials to determine the potential threat.

19. The system of claim 15 wherein the system includes a means branch, a motive branch, and a suspicion branch to analyze detected objects.

20. The system of claim 15, wherein the detected object is a satellite.

* * * * *